United States Patent Office 3,728,298
Patented Apr. 17, 1973

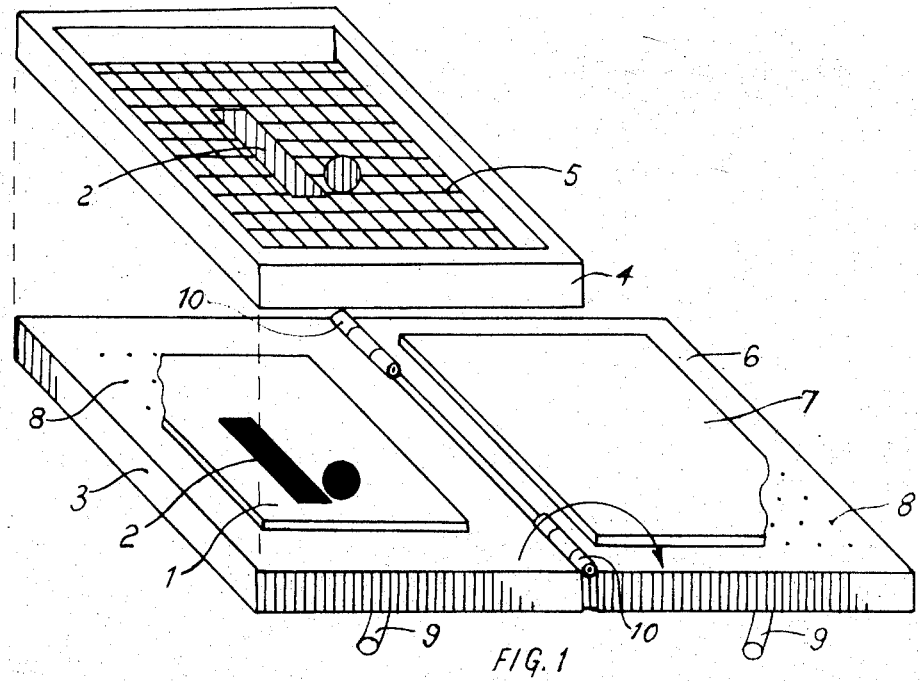
FIG. 1
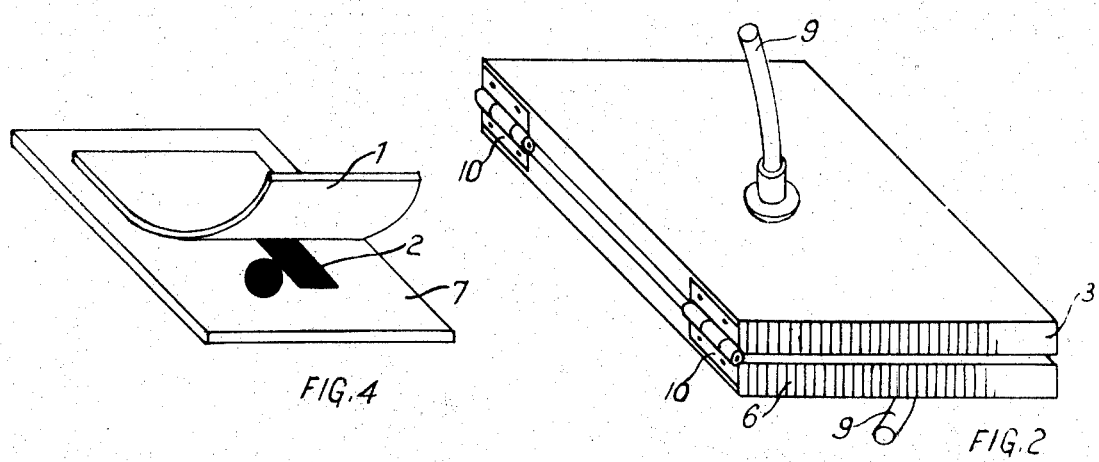
FIG. 4
FIG. 2
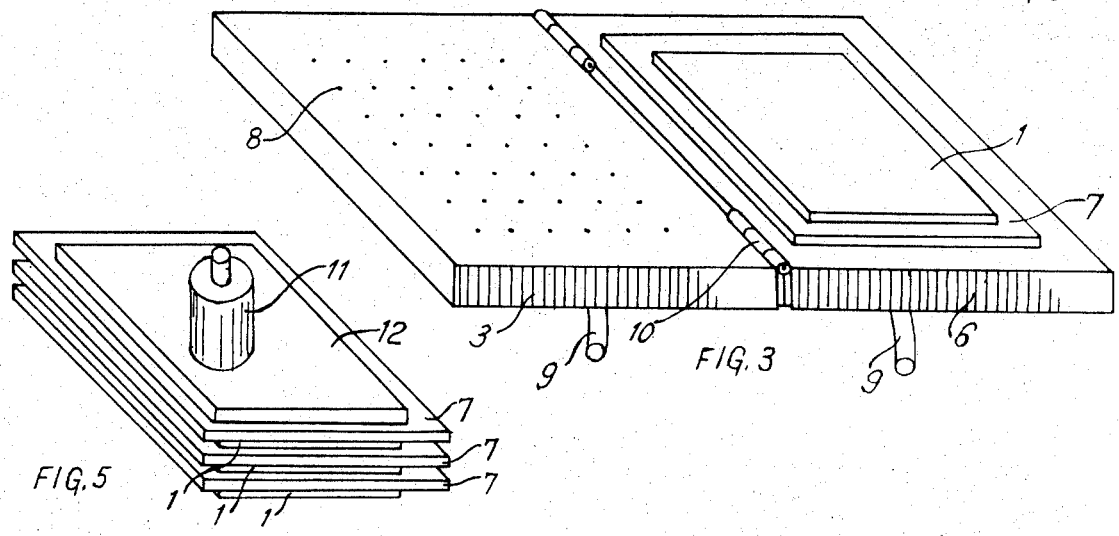
FIG. 3
FIG. 5

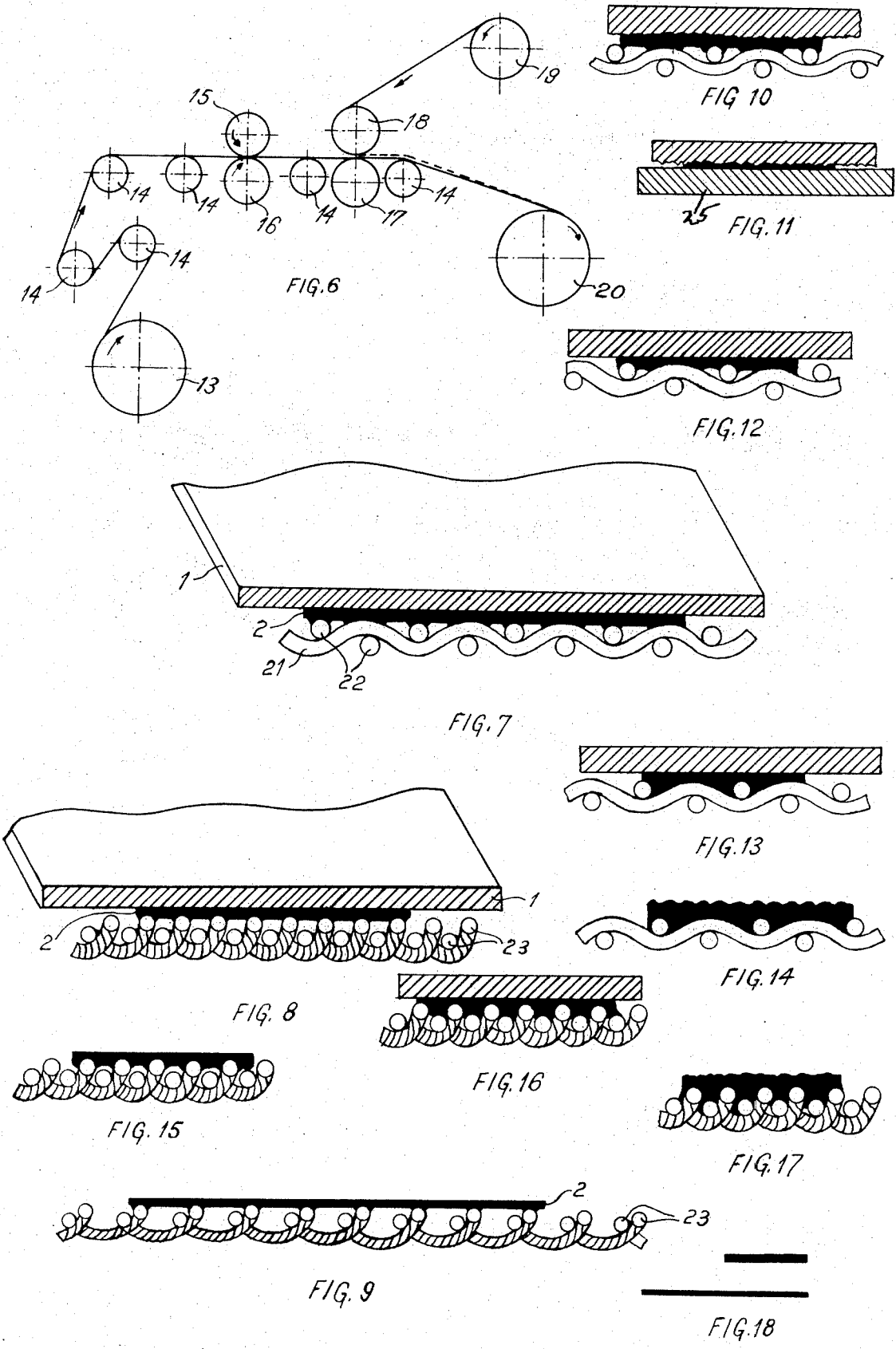

3,728,298
POLYEURETHANE PRINTING INK AND METHOD OF USING SAME
George Hartmann, 69—43 Nansen St.,
Forest Hills, N.Y. 11375
Filed Sept. 4, 1970, Ser. No. 69,666
Int. Cl. C08g 51/42
U.S. Cl. 260—31.4 R    4 Claims

ABSTRACT OF THE DISCLOSURE

A printing ink formed from liquid urethane polymer of polyether type, having an extended pot life. Variation in formulation permits control of viscosity, color and elasticity. The ink may be applied by direct or transfer printing to smooth, textured surfaces and to textile surfaces with surface adherence or pressed into the weave or knit to control stretchability of the fabric in localized areas.

---

This invention relates generally to specialized printing inks, and more particularly to a printing ink based upon polyeurethane resin which is applied in a relatively uncured state, and is permitted to cure in room temperature under the action of curing agents (or vulcanizing agents), catalisators, in approximately two weeks, and when speed of production is required by radiation, or heat, or by chemical action with such approximate time relation: radiation by seconds, heat by minutes, and chemical by minutes.

Previous attempts to use polyeurethane as an ink for printing are known in the art, and many technical difficulties have been encountered. In many cases, the only known catalisators have made the pot life of the eurethane so short that the viscosity of the ink was too great within a relatively short period of time to permit application by printing. Attempts to increase the pot life have been unsuccessful in that the physical properties of the polyeurethane when ultimately cured have been unsatisfactory. Very often, the thickness of the printing has not been easy to control. This is particularly true in the case of urethane polymer of polyether type, which generally offers superior properties in other respects.

Another difficulty experienced in using liquid urethane polymer as an ink for printing lies in the coloring of the same. Most colors mixed with the urethane polymer while in the liquid state have tended to interfere with the chemical curing thereof, thereby resulting in an unpredictable pot life.

It is therefore among the principal objects of the present invention to provide an improved urethane polymer elastomer suitable for use as an ink for printing, in which the above mentioned disadvantages have been substantially elminated, providing elastic ink becoming rubberlike after curing with unusual strength and heat resistance.

Another object of the invention lies in the provision of an improved urethane printing ink which will obtain a strong bond with a wide variety of printing substrates.

A further object of the invention lies in the provison of an improved urethane ink which may be conveniently used with a wide variety of printing techniques, such as silk screen printing, roller coating, casting dipping and spraying.

A further object of the invention lies in the provision of an improved printing ink of urethane base susceptible to reception of differing textures during the printing operation or thereafter.

Yet another object of the invention lies in the provision of an improved printing ink of polyurethane base type which provides convenient handleability after printing, and prior to complete curing.

A feature of the disclosed embodiment lies in the unusual multiple washability in hot water (185° to 200° F.) in strong detergent as used by commercial washing systems without any damage to the ink deposited on the substrate and ability to withstand dry cleaning. This differs dramatically from conventional urethane coating which can withstand temperature to 200° F., in that my urethane printing can withstand temperatures up to 700° F.

Another feature of the disclosed embodiment lies in the fact that application of the ink to a substrate may be conveniently accomplished at room temperature.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIG. 1 is a view in perspective of an apparatus embodying the invention for effecting transfer printing, in accordance with one mode of utilizing the invention.

FIG. 2 is a similar view in perspective showing certain of the component parts in altered relative position.

FIG. 3 is a third view in perspective of the apparatus, showing the completion of transfer of a release paper bearing an image to a substrate.

FIG. 4 is a view in perspective showing the subsequent removal of the transfer paper.

FIG. 5 is a view in perspective showing the stacking of a plurality of laminated substrates and image bearing transfer papers under pressure to effect the transfer of the ink image from the paper to the substrate.

FIG. 6 is a schematic view of a printing press for accomplishing the process shown in FIGS. 1 to 5 on a continuous basis.

FIG. 7 is a fragmentary view in perspective showing the adherence of a transferred image to the individual dual threads of a woven fabric.

FIG. 8 is a similar view in perspective showing the application of an inked image to the threads of a knitted fabric.

FIG. 9 is a fragmentary sectional view showing the subsequent stretching of the fabric shown in FIG. 8, after removal of the transfer paper, and the subsequent stretching of the ink image therewith.

FIG. 10 is a fragmentary sectional view showing the adherence of an ink image to a woven textile fabric, in which the transfer paper has been embossed to provide a corresponding texture on the exposed surface of the ink image.

FIG. 11 is a similar sectional view, showing the application of an ink image to a stiff continuous surface, such as wood, synthetic resin, or the like.

FIG. 12 is a sectional view corresponding to that seen in FIG. 10, but showing a thicker ink image transferred to the substrate by direct printing, with correspondingly greater engagement of the threads of the fabric forming the substrate.

FIG. 13 is a similar sectional view showing the effect of exerting greater pressure on the transfer paper, with correspondingly greater engagement of the ink image with the threads of the fabric.

FIG. 14 shows an application similar to that seen in FIG. 13, additionally provided with a textured surface.

FIG. 15 is a sectional view showing the application of a relatively thick ink image upon a knitted substrate.

FIG. 16 illustrates a sectional view corresponding to that seen in FIG. 15, with greater penetration of the knit threads resulting from increased pressure upon the ink image at the time of transfer.

FIG. 17 shows a textured heavy ink coat upon a knitted fabric, in which not only is flexibility impaired, as in FIG. 16, but extensibility as well.

FIG. 18 is a schematic view comparing the thickness of an unstretched and a stretched ink image.

Before entering into the technical aspects of the disclosed embodiments, a brief consideration of the broader aspects of the invention is believed appropriate.

As has been stated, urethane, of the polyether type with the addition of a curing agent can form a particularly versatile ink. This polymer is based upon the reaction product of isocyanates containing active hydrogen compound, the result may produce either elastomers or adhesives.

It is well known in the technical literature to use the polyester type of urethane, which generally is cheaper and has inferior physical properties with respect to polyether type. Short pot life has been the principal difficulty of both types.

The present invention contemplates a pot life of approximately forty hours. This period of time will enable the elastomer to be used in a wide variety of applications, such as dipping, painting, and the like. For printing, a pot life of twenty hours is adequate. It is preferable that fresh ink be prepared for one day use, for best results. Where longer pot life is desirable, or where a substantial quantity is unused, it is possible to extend pot life by tightly covering the elastomer and maintaining it at freezing temperatures. The following day, no dilution is required, ethylene glycol monoethyl ether acetate may be added and mixed if stored for prolonged time in a frozen state.

In the printing of textiles, there will normally be no requirement with regard to surface preparation. Fabrics coming directly from the mill have surfaces which are relatively uncontaminated, and this is also true of cut goods. Where cotton has been sized with starch or similar substances, printing quality may be inferior. This is also true of silicon treatment, or the presence of any oily or greasy substances.

Printing may also be accomplished directly, or by transfer upon synthetic resinous surfaces. Care must be taken to avoid resins containing migrating plastisol derivatives which can deleteriously affect printing quality. Likewise, grease, oil or similar substances will prevent adherence of the ink.

Ink formulated in accordance with the following disclosure is an agressive compound, and printable on a wide variety of substances, including metals, knitted and woven textiles, non-woven fabrics, leather, paper, rubber, ceramics and the like. With care, reasonably permanent bonds can be obtained on heretofore unprintable surfaces, such as polytetrafluoroethylene and the like.

The mixing substances are proportionally formulated in such manner that every ingredient (besides polyether itself) has a double or a triple function, for example:

(1) Adding a viscosity agent provides increasing viscosity to suit the formulation and also heat resistance;

(2) Using castor oil as a vehicle for colors also functions as an elasticity agent (more or less added to the prescribed formulation), and as a curing agent (vulcanizing agent) for prolonging pot life, and for better adhesion.

The following example is illustrative:

EXAMPLE I

Curing agent 20 hour pot life:

| | Grams |
|---|---|
| Acetone, polyurethane grade | 55.7 |
| Adipic acid | 1.6 |
| Cellosolve acetate (ethylene glycol monoethyl ether acetate) 99% polyurethane grade | 100.0 |
| 4,4'-methylene bis (2-chloroaniline) | 19.7 |

Mix the acetone and adipic acid first, and when thoroughly mixed, progressively add the Cellosolve acetate and the methylene. When the reaction has been completed, the curing agent may be stored relatively indefinitely in a well stoppered brown bottle. For normal use obtaining a pot life of approximately forty hours, mix, by weight, 100 parts of urethane polymer to 21.6 parts of curing agent.

COLORING AGENTS

Coloring agents may be either of a pigmented type, or resort may be made to organic dyes. I have found that no interference with chemical reaction takes place where the colors are mixed with a highly refined castor oil. Since castor oil is a natural product, some variation in pot life will occur with the addition of colors having different chemical characteristics. The following example, has been found to maintain pot life to plus or minus 10%, which will normally be acceptable for most applications.

EXAMPLE II

Pigmented colors

| Color concentrates: | Parts |
|---|---|
| DB oil (Baker Chemical Company) | 53 |
| Ingrazin Violet BLT (Geigy Chemical Corp.) | 47 |
| DB oil | 47 |
| Ingrazin Violet 6 RLT | 42 |
| DB oil | 53 |
| Ingrazin Red 2 BLT | 47 |
| DB oil | 44 |
| Ingrazin Yellow 3 RLT | 39 |
| DB oil | 50 |
| Ingrazin Yellow 3 RLT | 44 |
| DB oil | 53 |
| Ingrazin Orange RLT | 47 |
| DB oil | 53 |
| Titanium Dioxide White | 47 |
| DB oil | 53 |
| Carbon black | 47 |
| Transparent colors: | |
| DB oil | 47 |
| Indofast Violet Toner B 4020 (National Aniline Division Allied Chemical Corp.) | 42 |
| DB oil | 49 |
| Phtalo Blue Toner B 4714 | 43 |
| DB oil | 53 |
| Scarlet Toner R 6300 | 47 |
| DB oil | 53 |
| Red Mv 6632 | 47 |
| DB oil | 52 |
| Orange Ov 5983 | 46 |
| Yellow Y 5783 | 42 |
| DB oil | 47 |

EXAMPLE III

Concentrate

| | Parts |
|---|---|
| Castor oil DB | 100 |
| Grasol (Geigy Chemical Corp.) fast dyes plus 3 parts pyrogenic silica optional | 10 |

| Light colors: | Parts |
|---|---|
| DB castor oil | 100 |
| Grasol (Geigy Chemical Corp.) fast dyes | 1.3 |

EXAMPLE IV

Colorless additive

When transparent colorless coating is needed.

| | Parts |
|---|---|
| DB castor oil | 100 |
| Pyrogenic silica, particle size .007–010 micron Cab-O-Sil Brand. | 4 |

For every 100 grams of urethane polymer use 20 grams of pigmented or toner colors. The sequence of mixing with pigment and toner is as follows:

(1) Urethane polymer    (4) Filler if needed
(2) Curing agent        (5) Viscosity agent
(3) Color in oil For every 100 grams of urethane polymer use 11 grams of transparent dyes color in oil. The sequence of mixing with dyes colors is as follows:

(1) Curing agent        (3) Urethane polymer
(2) Dyes color          (4) Viscosity agent For every 100 grams of urethane polymer, use 20 parts pigmented color in oil. For every 100 grams of urethane polymer use 10 parts dyes in oil.

Filler

A filler, when used, may have two functions. Firstly, it may be used as a cheap product to lower the total cost of the ink. Secondly, when a stiff formulation is required, as for example when printing on Spandex and the like, and a restriction of expansibility is required. As a filler, York White may be used, as can Iceberg Clay (Carrol Co.) in the proportions of 28 parts thereof for 100 parts of urethane polymer. When transparent dyes are employed, powdered pyrogenic silica should be used to suit.

Curing

Curing at room temperature under the action of curing agents in the formula, and without the assistance of air and moisture is normally completed in approximately two weeks. After approximately 24 hours, the release paper may be stripped from the substrate, and the substrate rolled or stacked for curing at room temperature. If greater speed is required, after removal of the release paper, the substrate should be immersed in a hot solution of 20% boric acid for one minute, and subsequently washed and dried. The curing is then partial. If greater production capacity is required, and storage space is limited, curing may be accomplished in an oven, with temperature restriction applied only to substrates. From approximately 1 minute to 15 minutes will normally be adequate. At this stage handleability is achieved, so that stacking, winding and the like is possible. Curing can occur completely at room temperature during a period of two to three weeks. If curing is desired earlier, then immersion in the boric acid solution will complete the curing, remove the isocyanate odor, and promote embossing.

Regulating pot life

The pot life of the basic formula may be adjusted by varying the concentration of the 4,4'-methylene bis (2-chloroaniline) in the curing agent (Example 1). 19.7 grams will give a pot life of approximately 20 hours. Increase in this ingredient to 25 grams will yield a pot life of approximately 12 hours, and decrease to 10 grams will give a pot life of about 80 hours.

Referring now to the drawings, FIG. 1 illustrates schematically an apparatus suitable for printing on a transfer paper prior to application to a substrate. Transfer printing is generally known in the art, and it is particularly useful where the surface of the substrate does not lend itself to the application of direct printing.

As seen in FIG. 1, a screen frame 4 includes a screen 5 having a portion 2 thereof which is uncovered to permit the deposition of ink therethrough. A printing support 3 is provided with openings 8 connected to a vacuum source through a tube 9, whereby upon the creation of a vacuum, the transfer paper 1 will be fixed thereon. The panel 3 is interconnected by hinge means 10 to a similar panel 6 which supports a substrate 7 in similar manner.

When printing has been accomplished, the panel 3 is folded about the hinge 10 to overlie the panel 6, as seen in FIG. 2, and the vacuum supply to the panel 3 is discontinued. Referring to FIG. 3, the panel 3 may be returned to its original position, and the now laminated transfer paper 1 and substrate 7 may be removed to be placed as seen in FIG. 5 in stacked relation with similar previously prepared laminates. A weight 11 exerts a force through a plate 12 to transfer the image from the release paper 1 to the substrate 7, and upon removal from the stack, and after the ink has at least partially cured, the individual release papers may be peeled away from the substrate, as seen in FIG. 4. The now printed substrate may be allowed to further cure as described above.

FIG. 6 illustrates a press arrangement for continuous printing from release paper upon a web substrate. The transfer paper emanates from a course 13, and subsequently passes about idler roller 14 to printing rollers 15 and 16. Lamination is accomplished between rollers 17 and 18 with a continuous web or substrate emanating from a roll 19, and the laminate is rolled at 20. Curing may be accomplished by immersing the entire web 20 into a boric acid bath for approximately 1–15 minutes, or, where time permits, curing may be accomplished without such assistance over a longer period of time.

FIG. 7 illustrates the effect of transfer printing on woven textile substrates. The transfer paper 1, bearing an ink image 2 overlies the warp threads 21 and weft threads 22 of the substrate engaging the exposed surfaces of each to be bonded thereto. Upon removal of the transfer paper, and curing of the ink image, the textile material will lose almost none of its flexibility, and the ink image will assume the appearance of an applique.

In FIG. 8, a similar effect is shown in conjunction with a knit substrate, in which the individual threads 23 are contacted by the image at relatively few points. Such treatment will enable the knit fabric to be stretched without loss of adherence between the image and the textile threads. FIG. 9 shows the elongation of the substrate and corresponding elongation of the ink image, a relatively thick ink image is provided, so that the same will not be unduly weakened by stretching. FIG. 18 illustrates the thinning of the image with progressive elongation.

It is also possible to print on transfer paper, and allow the printed image to completely cure prior to transfer. The printed image may be subsequently transferred to a substrate by subsequently coating the entire substrate or only the image on the substrate, or the transfer entirely or only the covering image with a layer of clear ink having a greater affinity for the substrate and the image than for the transfer paper. In this procedure, the subsequent ink acts as an adhesive, rather than as an image bearing layer.

I wish it to be understood that I do not consider the invention limited to the precise details of structure shown and set forth in the specification, for obvious modifications will occur to those skilled in the art to which the invention pertains.

I claim:
1. A curable polyurethane ink consisting essentially of the reaction product of approximately, by weight, 100 parts polyurethane and 21.6 parts of a catalisator, said catalisator consisting essentially of approximately 55.7 parts acetone, 100 parts ethylene glycol monoethyl ether acetate, and 21.3 parts of the reaction product of 1.6 parts adipic acid and 19.7 parts 4,4' methylene bis(2-chloroaniline).
2. An ink composition in accordance with claim 1, and with 10 to 20 parts of a curing polyol.
3. An ink composition in accordance with claim 1, including a coloring agent including pigments suspended in said polyol.
4. An ink composition in accordance with claim 1, including an organic dye dissolved in polyol as a coloring agent.

References Cited

UNITED STATES PATENTS

| | | | |
|---|---|---|---|
| 3,502,621 | 3/1970 | Wilson | 260—31.4 |
| 2,929,800 | 3/1960 | Hill | 260—32.8 N |
| 3,476,696 | 11/1969 | Quinn | 260—31.4 |

OTHER REFERENCES

Rubber World, "Materals and Compounding Ingredients for Rubber and Plastics," pp. 137–138, 1965.

MORRIS LIEBMAN, Primary Examiner

P. R. MICHL, Assistant Examiner

U.S. Cl. X.R.

260—32.8 N, 77.5 AM, DIG 38